United States Patent
Antici et al.

(10) Patent No.: US 12,298,263 B2
(45) Date of Patent: May 13, 2025

(54) METHOD AND SYSTEM FOR STRESS TESTING OF MATERIALS USING LASER ACCELERATED PARTICLES

(71) Applicants: INSTITUT NATIONAL DE LA RECHERCHE SCIENTIFIQUE, Quebec (CA); Università della Calabria, Rende CS (IT)

(72) Inventors: Patrizio Antici, Montreal (CA); Marianna Barberio, Crucoli KR (IT)

(73) Assignees: INSTITUT NATIONAL DE LA RECHERCHE SCIENTIFIQUE, Québec (CA); UNIVERSITA DELLA CALABRIA, Rende (IT)

( * ) Notice: Subject to any disclaimer, the term of this patent is extended or adjusted under 35 U.S.C. 154(b) by 649 days.

(21) Appl. No.: 16/766,628

(22) PCT Filed: Nov. 22, 2018

(86) PCT No.: PCT/CA2018/051483
§ 371 (c)(1),
(2) Date: May 22, 2020

(87) PCT Pub. No.: WO2019/100156
PCT Pub. Date: May 31, 2019

(65) Prior Publication Data
US 2021/0010958 A1 Jan. 14, 2021

Related U.S. Application Data

(60) Provisional application No. 62/589,858, filed on Nov. 22, 2017.

(51) Int. Cl.
| | |
|---|---|
| *H05H 15/00* | (2006.01) |
| *G01N 21/31* | (2006.01) |
| *G01N 23/2209* | (2018.01) |
| *G01N 23/2251* | (2018.01) |
| *G21K 5/00* | (2006.01) |
| *H05H 3/00* | (2006.01) |

(52) U.S. Cl.
CPC ......... *G01N 23/2251* (2013.01); *G01N 21/31* (2013.01); *G01N 23/2209* (2018.02); *G21K 5/00* (2013.01); *H05H 3/00* (2013.01); *H05H 15/00* (2013.01); *G01N 2223/072* (2013.01); *G01N 2223/40* (2013.01); *G01N 2223/507* (2013.01)

(58) Field of Classification Search
None
See application file for complete search history.

(56) References Cited

PUBLICATIONS

M. Sciscio, et al., Analysis of induced stress on materials exposed to laser-plasma radiation during high-intensity laser experiments, Appl. Surf. Sci. (2017) (Year: 2017).*

(Continued)

*Primary Examiner* — Michael Maskell
(74) *Attorney, Agent, or Firm* — Lavery, de Billy, L.L.P; Gwendoline Bruneau

(57) ABSTRACT

A system and method for stress testing a sample, the system comprising a high-intensity laser unit and a target for laser-matter interaction, wherein the high-intensity laser unit delivers an intensity of at least $10^{13}$ W/cm$^2$ on the target, and resulting laser-accelerated particles generated by the target irradiate the sample.

7 Claims, 14 Drawing Sheets

(56) References Cited

PUBLICATIONS

Hiroyuki Daido et al. Review of laser-driven ion sources and their applications, Rep. Prog. Phys. 75 (2012) (Year: 2012).*
Alvarez et al., Ultraintense Lasers as a Promising Research Tool for Fusion Material Testing: Production of Ions, X-Rays and Neutrons, Plasma and Fusion Research: Regular Articles, vol. 8, 3404055 (2013) (Year: 2013).*
Dogar et al. "Estimation of ion accelerating potential inside the nanosecond pulsed laser produced tungsten plasma" Eur. Phys. J. D 71: 250 (2017) (Year: 2017).*
Vo et. al., In situ micro-tensile testing on proton beam-irradiated stainless steel, 493 Journal of Nuclear Materials 336-342 (2017) (Year: 2017).*
Borghesi et al., Electric field detection in laser-plasma interaction experiments via the proton imaging technique, 9 Phys. Plasmas, 2214-2220 (2002) (Year: 2002).*
Agostinelli, S., et al., Nuclear Instruments and Methods A 506, 250 (2003).
Albertazzi, B., et al., EPJ Web of Conferences 59, 17014 (2013).
Albertazzi, B., et al., Science 346, 325 (2014).
Aliakbari, A., Najafi, E., Amini, M.M. et al. Structure and photoluminescence properties of lead(II) oxide nanoparticles synthesized from a new lead(II) coordination polymer. Monatsh Chem 145, 1277-1285 (2014).
Allison, J., et al., IEEE Transactions on Nuclear Science 53 270 (2006).
Alvarez, J., et al., Plasma and Fusion Research 8, 3404055 (2013).
Antici, P., et al., ECA, 29 C 0-3.003 (2006).
Antici, P., et al., J. Phys. IV 133, 1077 (2006).
Barberio, M., et al., Sci. Rep. 7, 40415 (2017).
Battistoni, G., et al. Prog. Nuc. Sc. Techn. 2, 358 (2011).
Bolt, H., et al, Journal of Nuclear Materials 66, 329-333, (2004).
Bonnet, T. et al., Response functions of Fuji imaging plates to monoenergetic protons in the energy range 0.6-3.2 MeV, Rev. Sci. Instrum. 84, 013508-013513 (2013).
Borghesi, M., et al., Phys. Rev. Lett. 92, 055003 (2004).
Broeders, C.H.M., et al., Journal of Nuclear Materials 336, 201-209 (2005).
Caturla, M.J., et al., Linear Collider Collaboration Tech Notes, LCC-0093, UCRL-JC-148049 (2002).
Chen, S.N., et al., Physics of Plasmas 21, 023119 (2014).
Clark, E. L., et al., Phys. Rev. Lett., 84, 670 (2000).
Davis, E.A., Mott, N. F., Conduction in non-crystalline systems V. Conductivity, optical absorption and photoconductivity in amorphous semiconductors, Philosophical Magazine A 22 (179): 903-922 (1970).
Dromey, B., et al., Nature Communications 7, 10642 (2016).
Editorial, Nature Materials 15, 1 doi:10.1038/nmat4533 (2016).
Flippo, K., et al., Rev. Sci. Intrum. 79, 10E534 (2008).
Fuchs, J., et al., Nature Physics 2, 48-54 (2006).
Fuchs, J., et al., Phys. Rev. Lett. 94, 045004 (2005).
Fukahori, T., et al., A calculation method of PKA, KERMA and DPA from evaluated nuclear data with an effective single particle emission approximation (ESPEA) & Introduction of Event Generator Mode in PHITS Code, presented at IAEA/TM on Primary Radiation Damage: from nuclear reaction to point defect, Oct. 1-4, 2012, VIC, Room A2712, IAEA, Vienna, Austria.
Green, J. S., et al., Appl. Phys. Lett. 104, 214101 (2014).
Hegelich, M., et al., Phys Rev Lett. 89, 085002 (2002).
Kim, I. J., et al., Phys. Rev. Lett. 111, 165003 (2013).
Kittel, C., Introduction to Solid State Physics, 8th Edition, Wiley (1991).
Latkowski, J.F., et al., J. Nucl. Mater. 347, 255-265 (2005).
Ledingham, K. W., et al, Applied Sciences 4(3), 402, (2014).
Mančić et al., High Energy Density Physics 6, 21 (2010).
Mančić, A. et al., Picosecond Short-Range Disordering in Isochorically Heated Aluminum at Solid Density, Phys. Rev. Lett. 104, 035002 (2010).
Mančić, A., et al., Absolute calibration of photostimulable image plate detectors used as (0.5-20 MeV) high-energy proton detectors, Rev. Sci. Intrum. 79, 073301-073306 (2008).
Mckenna, P., et al., Plasma Phys. Control. Fusion 49 (2007) B223.
Meier, W.R., et al., Fusion Engineering and Design 89, 2489 (2014).
NIST Introduction of ESTAR PSTAR and ASTAR; http://physics.nist.gov/PhysRefData/Star/Text/intro.html (accessed Oct. 6, 2017).
Patel, P.K., et al., Phys. Rev. Lett. 91, 125004 (2003).
Renk, J., et al., J. Nucl. Mater. 347, 266 (2005).
Reynaud, C., et al., Quantitative determination of Young's modulus on a biphase polymer system using atomic force microscopy, Surface and Interface analysis 30, 185-189 (2000).
Seely, J. F., et al., High Energy Density Physics 7, 150 (2011).
Sethian, J.D., et al., IEEE Trans. Plasma Sci. 38, 690 (2010).
Snavely, R. A., et al., Phys. Rev. Lett. 85, 2945 (2000).
Cowan, T. E., et al., Phys. Rev. Lett. 92, 204801 (2004).
Tanaka, T.J., et al., J. Nucl. Mater. 347, 244 (2005).
Torrisi, L., et al., Plasma Phys. Control. Fusion 58, 025011 (2016).
Toschi, R., et al., Fusion Engineering and Design 163, 56, (2001).
Wilks, S.C., et al., Phys. Rev. Lett. 69, 1383 (1992).
Xia, X., et al., Journal of Alloys and Compounds, 644, 308 (2015).
Zeil, K., et al., New Journal of Physics 12, 045015 (2010).
Zenobia, S.J., et al., Nucl. Mater. 389, 213 (2009).
Albertazzi, B., et al., Review of Scientific Instruments 86, 043502 (2015).
Allen, M., et al., Phys. Rev. Lett. 93, 265004 (2004).
Bohlen, T. T., et al., Nuclear Data Sheets 120, 211 (2014).
Brown, C. G., et al., "Remote femtosecond laser induced breakdown spectroscopy (LIBS) in a standoff detection regime," Proc. SPIE 6219, Enabling Technologies and Design of Nonlethal Weapons, 62190B (May 26, 2006); https://doi.org/10.1117/12.663821.
Chen, S.N., et al. Collimated protons accelerated from an overdense gas jet irradiated by a 1 μm wavelength high-intensity short-pulse laser. Sci Rep 7, 13505 (2017). https://doi.org/10.1038/s41598-017-12910-6.
Clark, E. L., et al., Energetic Heavy-Ion and Proton Generation from Ultraintense Laser-Plasma Interactions with Solids, Phys. Rev. Lett. 85, 1654—Published Aug. 21, 2000.
Coleman, J. A., et al., "Effects of Damage by 0.8 MeV-5.0 MeV Protons in Silicon Surface-Barrier Detectors," in IEEE Transactions on Nuclear Science, vol. 15, No. 3, pp. 363-372, Jun. 1968, doi: 10.1109/TNS.1968.4324960.
Gao, Y., et al., (2017). An automated, 0.5 Hz nano-foil target positioning system for intense laser plasma experiments. High Power Laser Science and Engineering, 5, E12. doi:10.1017/hpl.2017.10.
Gitomer, S., et al., Phys. Fluids 29, 2679 (1986).
Harres, K., et al., Rev. Sci. Instrum. 79, 093306 (2008).
Higginson, D.P., et al., Phys. Rev. Lett. 115, 054802 (2015).
McKenna, P., et al. "Multiply charged ion acceleration studies using the Vulcan Petawatt laser." Target 4.5: 7-9 (2006).
Raffray, R.A., et al., J. Nucl. Mater. 347, 178 (2005).
Rieth, M., et al., Journal of Nuclear Materials 432, 482 (2013).
Roth, M., et al., Phys. Rev. Lett. 110, 044802 (2012).
Sasikala, R.K., et al., Multifunctional Nanocarpets for Cancer Theranostics: Remotely Controlled Graphene Nanoheaters for Thermo-Chemosensitisation and Magnetic Resonance Imaging. Sci Rep 6, 20543 (2016). https://doi.org/10.1038/srep20543.
Sciscio, M., et al., Analysis of induced stress on materials exposed to laser-plasma radiation during high-intensity laser experiments, Applied Surface Science, vol. 421, Part A, Nov. 1, 2017, pp. 200-204 https://doi.org/10.1016/j.apsusc.2016.12.004.
Stofel, E., et al., "Low-Energy Proton Damage to Silicon Solar Cells," in IEEE Transactions on Nuclear Science, vol. 17, No. 6, pp. 250-255, Dec. 1970, doi: 10.1109/TNS.1970.4325801.
Walters, W.S., et al. , Radiation Damage Effects on Spacecraft Materials., NATO ASI Series (Series E, Applied Sciences), vol. 245. Springer, Dordrecht (1993).
Zhang, J., et al., Effects of seed layers on controlling of the morphology of ZnO nanostructures and superhydrophobicity of ZnO nanostructure/stearic acid composite films, Materials Chemistry and Physics, (Nov. 1, 2016); https://doi.org/10.1016/j.matchemphys.2016.08.031.

(56) References Cited

PUBLICATIONS

Veltri et al., Laser Stimulated plasma-induced luminescence for on-air material analysis, Appl. Phys. Lett. 110, 021114 (2017).

* cited by examiner

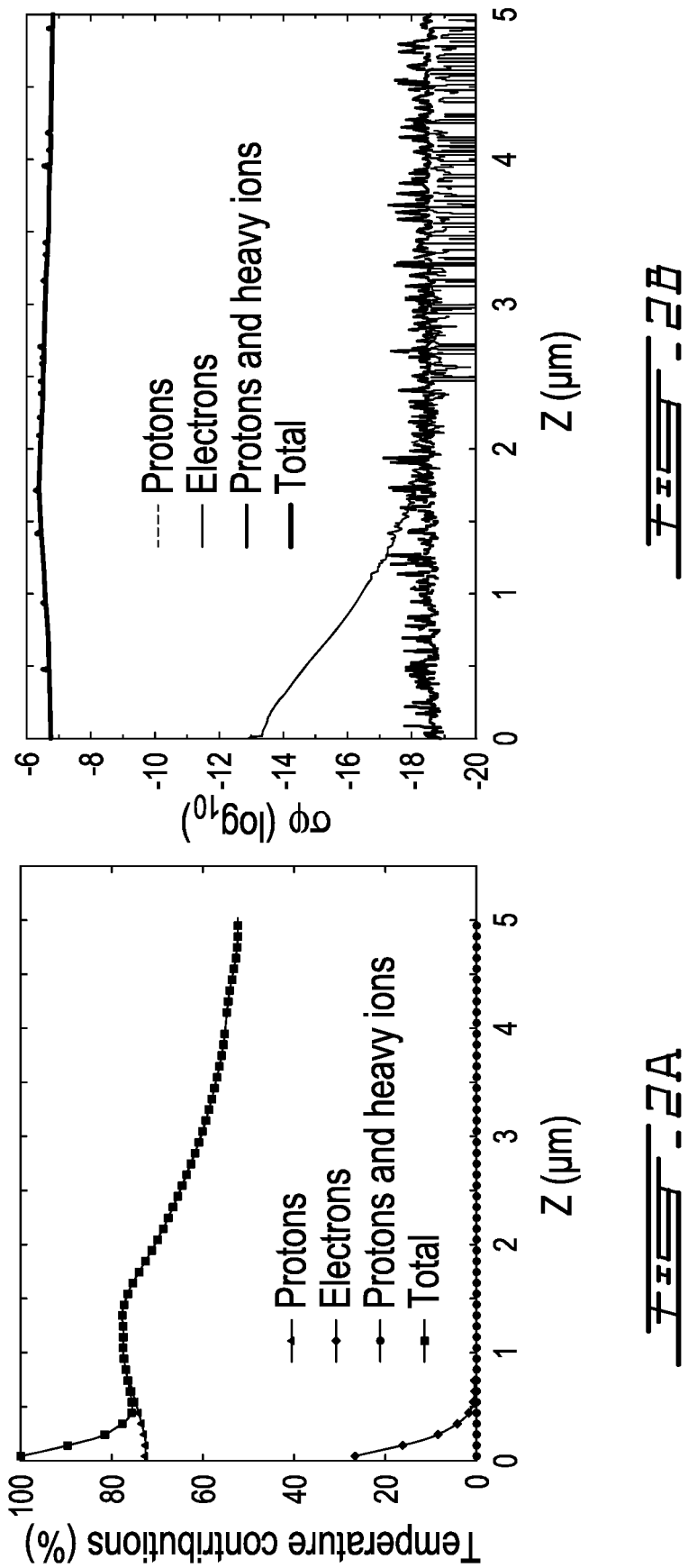

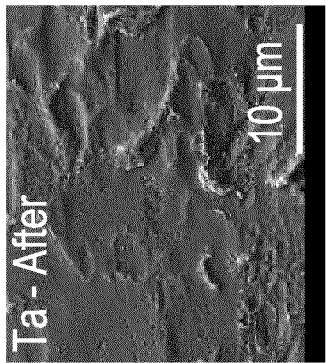
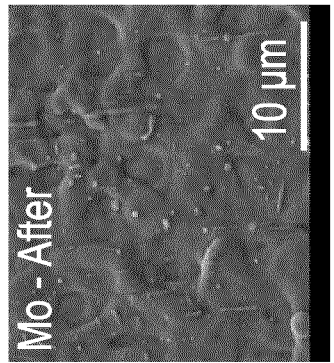
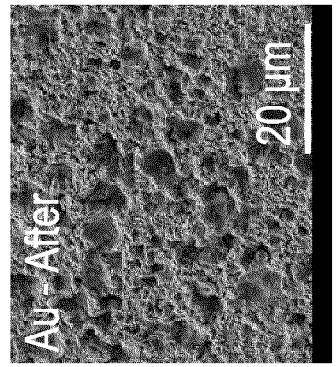
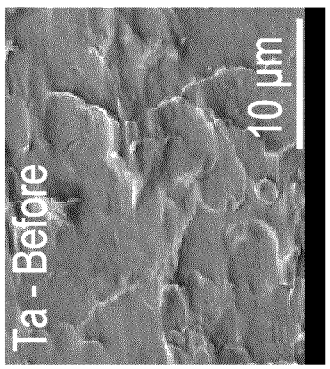
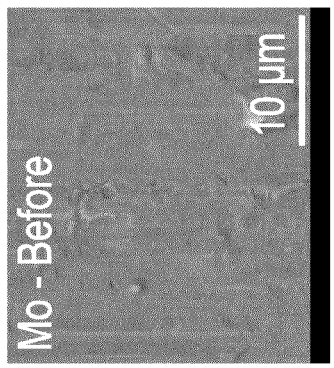
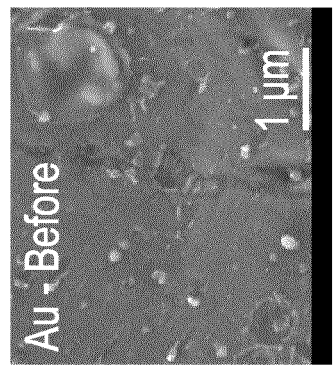
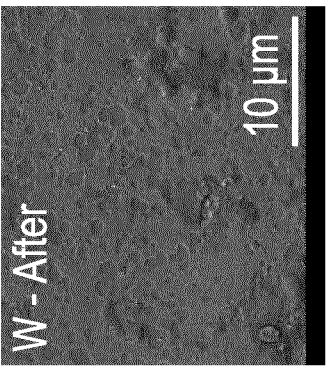
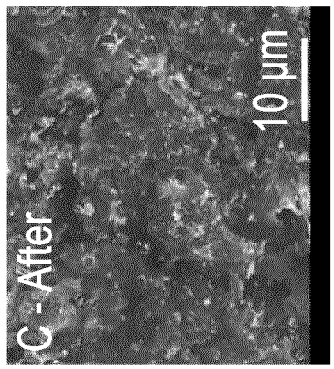
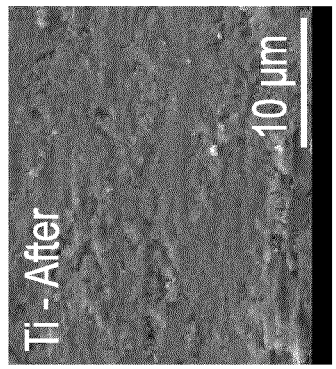
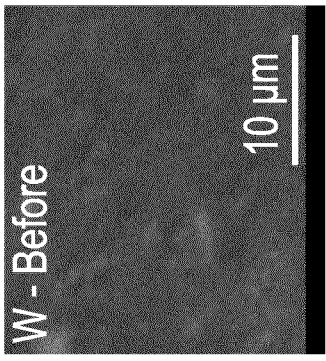
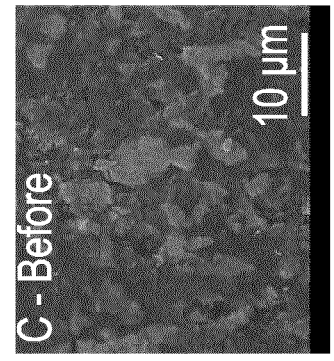
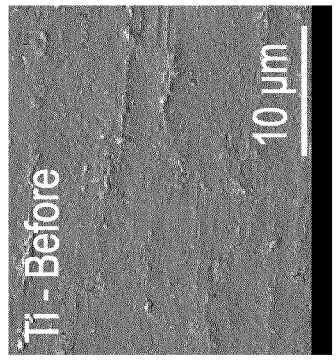
FIG - 3

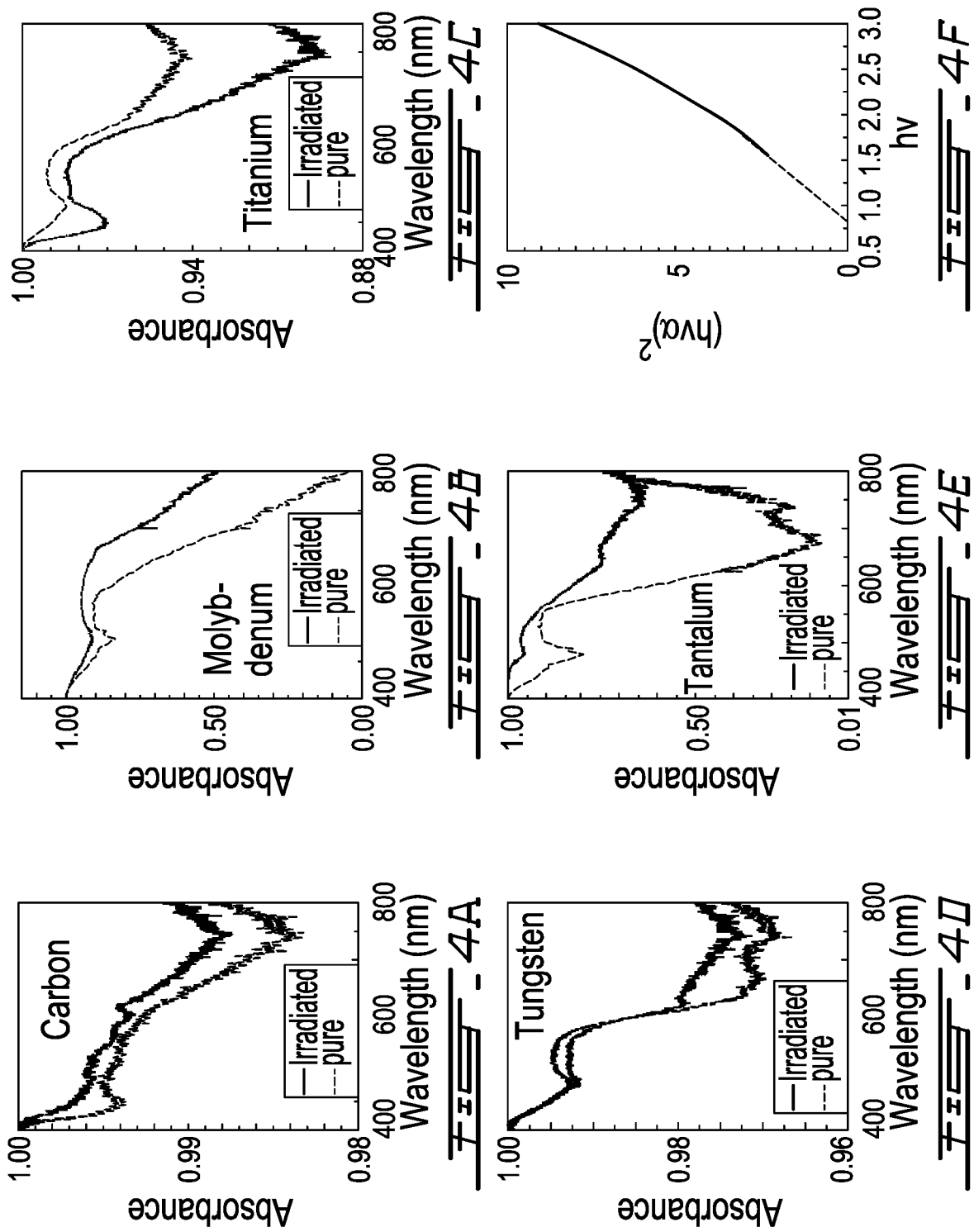

| Material | $C_p$ [J/kg/°C] | $\Delta T_{1,ave}$ [°C] | $D_{1,ave}$ [kGy] | $\Delta T_{2,ave}$ [°C] | $D_{2,ave}$ [J/kg/°C] | $\Delta T_{3,ave}$ [°C] | $D_{3,ave}$ [kGy] | $\Delta T_{4,ave}$ [°C] | $D_{4,ave}$ [kGy] |
|---|---|---|---|---|---|---|---|---|---|
| Au | 129 | 500 | 64.5 | 1271 | 164 | 721 | 93.0 | 1779 | 229 |
| Graphite | 720 | 374 | 269 | 701 | 505 | 534 | 384 | 983 | 708 |
| Mo | 250 | 405 | 101 | 945 | 236 | 582 | 146 | 1324 | 331 |
| Ta | 140 | 508 | 71.2 | 1235 | 173 | 732 | 102 | 1728 | 242 |
| Ti | 523 | 315 | 165 | 626 | 327 | 451 | 236 | 877 | 459 |
| W | 132 | 491 | 64.8 | 1253 | 165 | 708 | 93.4 | 1754 | 232 |

FIG. 9

METHOD AND SYSTEM FOR STRESS TESTING OF MATERIALS USING LASER ACCELERATED PARTICLES

CROSS-REFERENCE TO RELATED APPLICATIONS

This application is a National Entry Application of PCT application No. PCT/CA2018/051483 filed on Nov. 22, 2018 and published in English as WO2019/100156A1 under PCT Article 21(2), which itself claims benefit of U.S. provisional application Ser. No. 62/589,858, filed on Nov. 22, 2017. All documents above are incorporated herein in their entirety by reference.

FIELD OF THE INVENTION

The present invention relates to stress testing of materials. More specifically, the present invention is concerned with a method and a system for stress testing of materials.

BACKGROUND OF THE INVENTION

In the last decade, intense research has been conducted on the topic of laser-accelerated particle beams produced during laser-matter interaction using high-intensity lasers. Today, laser-accelerated particles such as laser-accelerated protons, characterized by about $10^{13}$ particles per shot, ps duration at the source, an energy in the tens of MeV [1] and very good laminarity [2] are routinely obtained. A number of applications are being developed on fields such as in astrophysics [3, 4] bright ultra-short neutron sources [5, 6], or medicine [7], and even material science [8,9]. Laser-accelerated protons can offer many opportunities in this last field [10], in particular based on their high particle flux that may be used for performing and analyzing stress tests on different materials that are exposed to high-energy fluence, i.e. harsh conditions. Examples of these conditions can be found in high-energy density/astrophysics, aero spatial applications, or energy production [11], for example in nuclear plants, and facilities in the Inertial or Magnetic Confinement Fusion (ICF-MCF) [12] in particular for plasma facing materials (PFM) [13, 14, 15].

Currently, a number of stress test methods including (i) the electron beam simulation of disruption heat flux, (ii) the He or Gamma-ray beam irradiation, and (iii) the exposure to a laboratory He plasma, each yield partial information on the changes of the material properties under stress are available. For obtaining a complete analysis of the material response to stress, a combination of methods is needed. Moreover, these test methods typically require long exposure times, are complex to model computationally, and fail to reproduce real operational environments [16, 17].

There is still a need in the art for a method and a system for stress testing of materials.

SUMMARY OF THE INVENTION

More specifically, in accordance with the present invention, there is provided a system for stress testing a sample, comprising a high-intensity laser unit and a target for laser-matter interaction, wherein the high-intensity laser unit delivers an intensity of at least $10^{13}$ W/cm$^2$ on the target, and resulting laser-accelerated particles generated by the target irradiate the sample.

There is further provided a use of laser-accelerated particles for testing a sample, comprising delivering an intensity of at least $10^{13}$ W/cm$^2$ on a target, thereby generating laser-accelerated particles, and irradiating the sample with the laser-accelerated particles.

There is further provided a method, comprising delivering an intensity of at least $10^{13}$ W/cm$^2$ on a target, thereby generating laser-accelerated particles, irradiating a first sample with the laser-accelerated particles, and measuring a resulting first deterioration of the first sample.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 2A shows temperature of laser-accelerated protons, electrons, photons and heavy ions in a tungsten sample within the first 5 μm; the 0 level indicates the sample surface facing the impinging proton beam;

FIG. 2B shows the σφ contributions of the laser-accelerated protons, electrons, photons and heavy ions in a tungsten sample within the first 5 μm; the 0 level indicates the surface of the sample facing the impinging proton beam;

FIG. 3 show SEM images of tungsten (W), tantalum (TA), carbon (C), molybdenum (Mo), titanium (TI) and gold (Au) samples before and after proton irradiation;

FIG. 4A shows optical absorption in the visible range for a carbon sample surface before and after proton irradiation;

FIG. 4B shows optical absorption in the visible range for a molybdenum sample surface before and after proton irradiation FIG. 4C shows optical absorption in the visible range for a titanium sample surface before and after proton irradiation;

FIG. 4D shows optical absorption in the visible range for a tungsten sample surface before and after proton irradiation;

FIG. 4E shows optical absorption in the visible range for a tantalum sample surface before and after proton irradiation FIG. 4F shows a Tauc plot after irradiation for tungsten (W);

FIG. 9 shows different doses as calculated using the energy deposition code;

DESCRIPTION OF ILLUSTRATIVE EMBODIMENTS

Figure 1B:
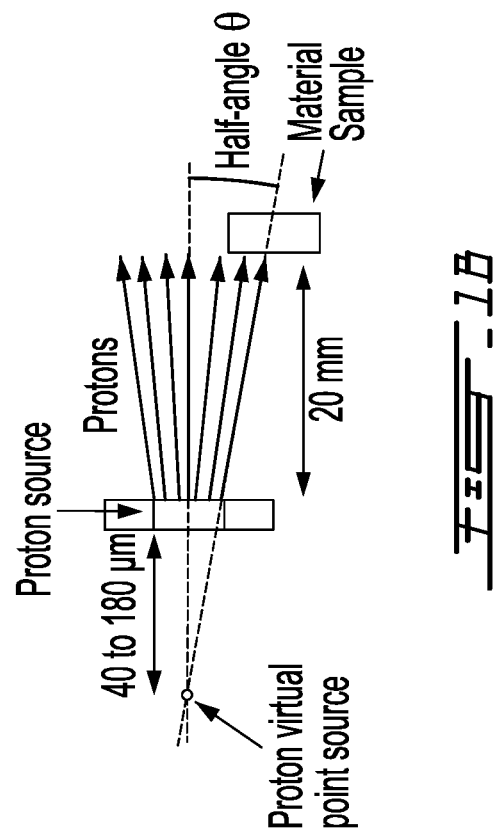
FIG. 1B is a schematic view of a source and virtual point source and cone half angle θ used in Monte Carlo simulations.

The present invention is illustrated in further details by the following non-limiting examples.

There is generally provided a method and a system for performing and analyzing stress tests on materials using laser-accelerated particles. In the following, the term "laser-accelerated particles" is used to refer to both laser-accelerated particles, such as protons, neutrons and electrons and laser-accelerated photons, such as X- and gamma-rays. In the following, laser-accelerated protons will be used as an example of such laser-accelerated particles.

Morphological, mechanical, electrical, and optical responses of five materials were tested, concentrating on high-melting point materials typically employed in Magnetic Confinement Fusion (ICF-MCF) facilities, and in particular as plasma facing materials (PFM) safety regulations. Experiments were thus focused particularly on 1) tungsten, which is a material currently used in Magnetic Confinement Fusion ICF facilities or reactors, 2) carbon (graphite), which is currently used for divertors, secondary walls, and junctions, and 3) titanium, tantalum, and molybdenum, suggested in the literature as good candidates for realizing nano- or W-based composite structures, since having a melting point higher than a maximum working temperature required by plasma facing materials (PFM) safety regulations [18]. The below described experiments demonstrate that a laser-accelerated proton beam allows reproducing a damage to the material equivalent to a damage typically obtained after several months of full operation of facilities producing a harsh environment for materials, such as ICF facilities or nuclear reactors for example.

Experiments were performed on the TITAN laser facility located at the Lawrence Livermore National Laboratory (LLNL, USA) [19].

An experimental set-up is shown in FIG. 1. A laser with energy 180 J and less than 10% shot-to-shot energy fluctuations, pulse duration of $\tau$=700 fs, wavelength $\lambda$=1.053 µm and beam diameter 25 cm was focused down by an f/3 parabola (focal distance about 75 cm) under high vacuum conditions to a 9 µm focal spot diameter full width at half maximum (FWHM), generating an on-target intensity of I of about $4\times10^{19}$ W/cm$^2$. The laser hit with normal incidence onto a gold foil of a thickness comprised in the range between about 10 and 20 µm (gold purity 99.9%, commercially available from the supplier Goodfellow), thereby accelerating protons in the laser-forward direction using the Target-Normal-Sheath Acceleration (TNSA) [20] mechanism. In this acceleration process, the focused laser pulse generates at the front surface of the target, resulting from the ponderomotive force, energetic electrons, also referred to as "hot" electrons, with a mean energy of a few MeVs that travel through the target. While some electrons escape the target at a rear surface of the target, most electrons are retained by the negatively charged bulk of the target and form at the rear surface of the target a dense electron sheath over a distance comparable to the Debye length, which, in the present example is about 1 µm. This creates a charge separation electric field on the order of TV/m that accelerates residual water contaminants, including mainly Hydrogen, located on the back surface of the target from an initially unperturbed surface as the acceleration occurs in a timeframe shorter than the typical relaxation time of the bulk of the target. The ion beam is therefore accelerated normally from the initially unperturbed rear surface of the irradiated target.

The laser pulse was linearly S-polarized and the prepulse-to-main pulse contrast ratio was about $10^{-6}$, as it is typical for this class of laser systems. The repetition rate of the laser system was about one shot every 30 minutes, waiting time needed to cool down optical amplifiers.

Figure 1A:
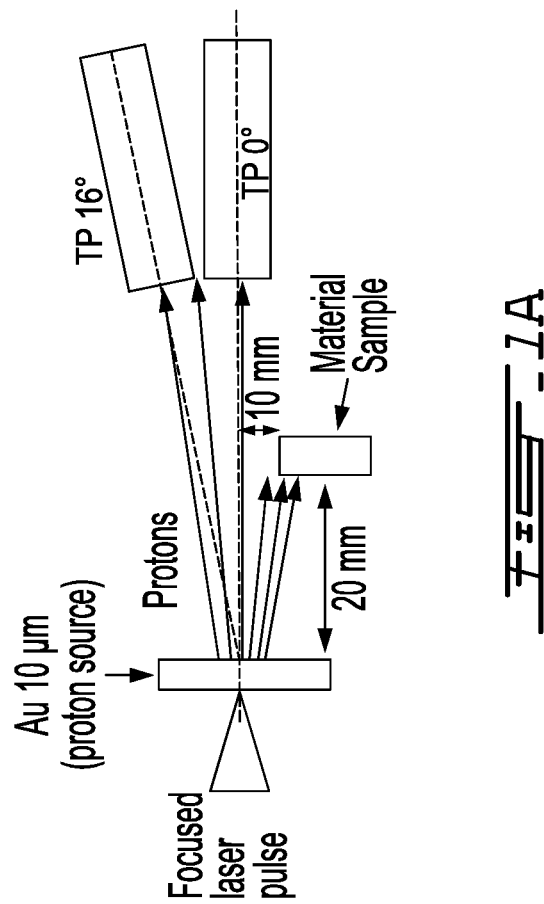
FIG. 1A is a schematic view of a system according to an embodiment of an aspect of the present disclosure.
Figures 1C, 1D, 1E:
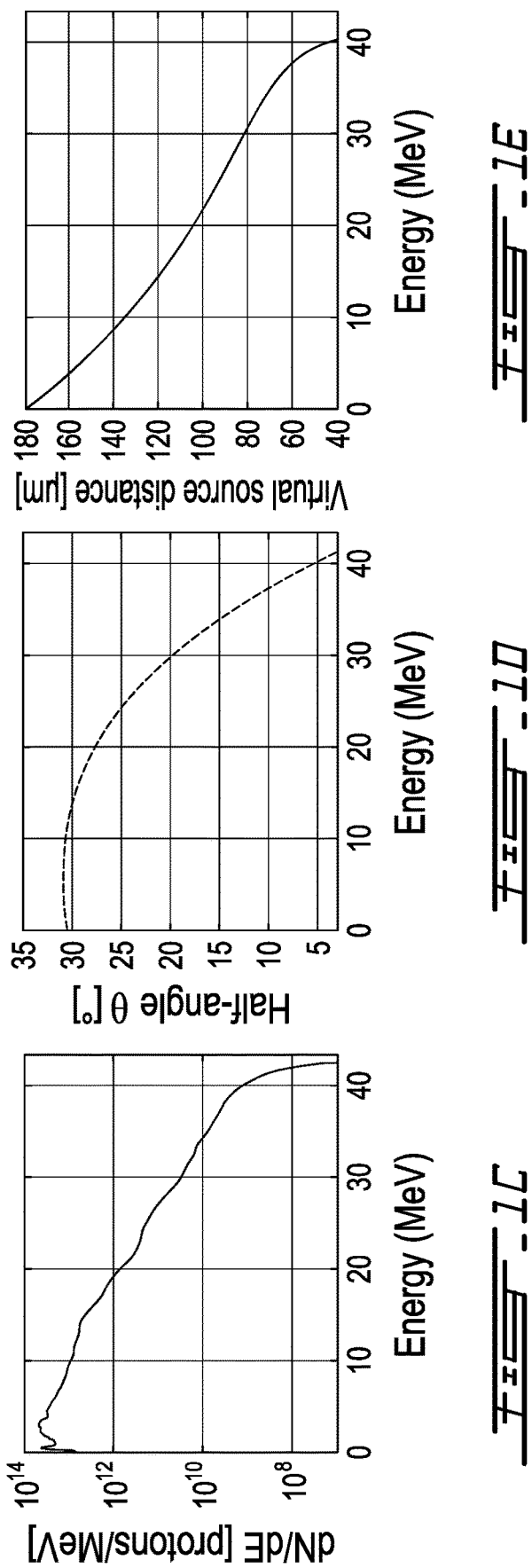
FIG. 1C is an example of an experimental proton spectrum obtained on the TITAN facility with the TP0°.
FIG. 1D is a graph of half angle divergence (θ) vs proton beam energy.
FIG. 1E is a graph of virtual source point distance against proton beam energy.

Several shots were performed, varying the distance (d) between the target acting as the proton source and the material samples to be stress tested from 5 mm to 4 cm (see FIGS. 1A and 1B). To allow for a measurement of the protons spectrum during the shot, the samples were placed 1 cm transversally above the beam center. A distance (d) of 2 cm between the source and this transverse plane was found to be a distance large enough to avoid a temperature within the sample above the melting point, yet small enough to yield a proton flux for irradiating the sample with a sufficiently high proton density.

Temperature maps of the samples computed using a Monte Carlo code into which the proton source parameters were inserted can be found in the Supplementary notes hereinbelow and are discussed later. The temperature produced by the impinging protons was also monitored by placing the material samples with a known melting point such as Gold, melting around 1065° C., inside the proton beam, and verifying that a melting process was taking place at the distance for which the code was predicting these temperatures. Selecting a distance (d) at 2 cm ensured that there was no interaction between the sample and secondary electrons emitted by the laser-plasma source, the threshold distance being typically in the range of a few hundreds of µm [21].

A series of commercially available material samples to be irradiated by the laser-accelerated protons, with dimensions of about 2×20 mm and thickness of 500 µm were used. These material samples were placed occupying a first half of the proton beam so that calibrated Thomson-Parabolas located at 0° (TP0°) and 16° (TP16°) with respect to the main pulse laser axis respectively could read out the spectrum during each shot using the second half of the proton beam (see FIG. 1A). The Thomson-parabolas also allowed measuring other ions that stem out of the rear target surface during the acceleration process; a detailed spectrum of all emitted ions being described in Supplementary notes below. The maximum proton energy detected was exceeding 40

MeV, in agreement with the maximum proton energy found on similar laser facilities [22, 23] or predicted by scaling law studies [24, 25]. The stability of the laser system allowed achieving a good repeatability of the acceleration process, with spectral shape fluctuations of about 15% for both the maximum energy and the particle fluence.

The material samples were characterized before and after irradiation in order to assess the changes in the morphological, chemical, optical, electrical, and mechanical properties. Morphological information such as surface roughness, presence of cracks, fractures, and holes after irradiation, was obtained by AFM and SEM microscopies while chemical composition of the surface was analyzed by Energy Dispersive X-ray (EDX) spectroscopy, taken under SEM conditions (see details in Supplementary notes below).

The experimental setup was prepared, and the experimental results were validated using different Monte Carlo and energy deposition codes in which the same source parameters as obtained during the shots (see FIGS. 1C and 1D) were inserted. Three different codes were compared: simulations were performed with FLUKA codes [27, 28] and a custom-made energy deposition code that was benchmarked with the particle transport code Geant4 [29, 30] (see Supplementary notes below). The source given as input to those codes was modeled as the projection of a proton point source with energy-depending diverging rays, thus generating a laminar diverging proton source with a variable diameter at the source (see FIG. 1A), consistent with Refs. [1, 2, 31] and measured data (see FIGS. 1B and 1C). The simulation used the quasi-Boltzmann spectral energy distribution as measured by the TPs during the experiment (see FIG. 1D), which represents a typical spectrum obtained on such kind of high-power lasers [32, 33, 34]. For each material sample, the simulations provided the temperature and the released energy, as well as the contribution given by the electrons, ions and photons. This is done in order to make sure that the temperature does not melt the sample and to adjust the particle flux required to perform the stress. Stress can be performed with lower particle flux only require more time to occur A typical parameter used in the field to monitor the deterioration of the material samples is the displacements per atom (dpa). To mention a few typical stress values on nuclear plants or ICF-MCF facilities, 15-30 dpa in a 5 years cycle [35, 36] can be cited, with about 10 dpa maximum per full power year (fpy) [37]. The displacements per atom (or dpa) is defined as the number of times that an atom is displaced for a given fluence, as follows:

$$dpa = \varphi \sigma \quad (1)$$

where $\varphi$ is the beam fluence and $\sigma$ is the cross section of the interaction, characterizing the probability that the incident beam interacts with the matrix atoms. The fluence $\varphi$ was evaluated using the proton beam spectrum that irradiates the front surface of the sample, such as obtained during the shots, as a function of the energy of the incident beam. Considering the following relation, where N(E) is the measured proton spectrum (see FIG. 1), A the surface onto which the proton beam impinges, the first surface layer using the TITAN laser was obtained:

$$\varphi = \int \frac{N(E)}{A} dE \approx 3.2 \times 10^{17} \frac{protons}{m^2} \quad (2)$$

For N(E) a typical spectrum (see FIG. 1C) and the divergence of the beam (see FIG. 1D) for evaluating the surface on the material sample were used. Since the proton beam was stable within 15-20% shot-to-shot energy fluctuations, values of FIG. 1 were taken as good representatives for all the shots of the experiments.

Estimating the interaction cross-section $\sigma$ for the materials [38] as of about $3 \times 10^{-25}$ m$^2$, $\sigma\varphi \sim 9.6 \, 10^{-8}$ was obtained for one single shot on the TITAN laser. Considering the geometry of the set-up, the proton beam impinging the material sample has a temporal length in the range of tens of ns. This is caused by the energy spread of the beam, which lengthens the proton beam from its ps length at the source to a few tens of ns when it reaches the material sample. Nevertheless, the beam length is much shorter than what obtained on conventional facilities, which is usually of mgs. Using a proton bunch length of about t=50 ns, and making the ratio with the value of $\sigma\varphi$, a dpa/s value in the few units was obtained, where the high value of dpa/s is related to the extremely short duration of the impinging proton bunch, in the tens of ns range, and high charge (see FIG. 1C). However, it is to be noted that the aim of the experiment was not to reproduce the dpa that are induced in facilities over a continuous timescale, but to analyze the overall damage caused by a single short proton shot and compare it to existing methods. As such, while other techniques using longer irradiation times and low particles flux might allow for an easier relaxation of the material to be stress-tested, the relevant result is the final damage generated in the sample, i.e. the material degradation. In the present case, this damage can be induced by one or, if needed, more shots, depending on the particle spectrum, since the $\sigma\varphi$ value depends on the particle spectrum, which varies with laser energy.

Different laser categories generating laser-driven protons may be distinguished as follows: 1) very high-energy long pulse lasers, which may be currently difficult to obtain commercially such as the LLNL-TITAN laser, having a maximum energy up to 180 J, a typical pulse duration of 700 fs, a central wavelength of 1.053 µm, a repetition-rate of at most 1 Hz [19, 39]; 2) high-energy long pulse lasers, which may be currently difficult to obtain commercially, but within reach for industry, such as the LULI-ELFIE (30 J, 350 fs, 1.056 µm, rep-rate<<1 Hz) [40]; 3) high energy short pulse lasers, which may be obtained commercially such as 1 PW laser (for example from Amplitude Technologies or Thales Optoelectronics), such as the ASTRA-GEMINI (10 J, 45 fs, 800 nm, envisioned rep-rate for future facilities 5-10 Hz (for example at the Extreme Light Infrastructure) [41]); and 4) high-energy short pulse lasers, commercially available as 100-500 TW laser (for example from Amplitude technologies) such as the FZD-DRACO laser (5 J, 25 fs, 800 nm, rep-rate 10 Hz) [42]. Considering typical proton fluences, the following $\sigma\varphi$ values may be obtained for each one of these categories: 1) $\sigma\varphi \sim 9.6 \times 10^{-8}$, 2) $\sigma\varphi \sim 1.5 \times 10^{-8}$, 3) $\sigma\varphi \sim 3 \times 10^{-9}$, and 4) $\sigma\varphi \sim 2.5 \times 10^{-9}$. Thus, while typically commercially available systems produce a $\sigma\varphi$ about 30 times lower; they have the advantage of higher-repetition rates, which allows cumulating over several shots in order to produce the desired level of stress to the sample.

The $\sigma\varphi$ value was computed using FLUKA, and the induced temperature increase was assessed by simulating the energy deposition of the different particle species into the irradiated sample according to the stopping power of the material of the sample. The numerical results for the different material samples show a peak value for $\sigma\varphi$ of about $2-3 \times 10^{-7}$ within the first micron of the sample, then a rapidly decreasing value of $\sigma\varphi$ up to about 10 µm from the front surface of the material sample, then a slower decrease of σφ from $1\times10^{-7}$ down to $7\times10^{-8}$ at the rear surface of the material sample. The peak in the first microns of the material sample is due to the fact that higher energy protons travel through the irradiated material sample without depositing their energy (Bragg peak) inside the bulk of the material sample, while lower energy protons deposit their energy in the first layers of the material sample, thereby increasing the global σφ value for these first layers.

Temperature values obtained with Geant4 and the custom-made code indicate that the temperature in the bulk of the material sample rises very quickly, consistent with typical proton-induced heating [43]), reaching a maximum in the first ns and remaining constant before a cooling phase starts. The cooling phase when using laser-accelerated proton beams is in the order of tens of ns, shorter than the cooling phase on conventional stress tests facilities [44], where the cooling is in the ms-regime for He and electron irradiation. Simulations confirm that during the entire process and for all materials listed in Table 1 below, the temperature within the sample remains safely below the melting point, about three times lower for the materials W, Ta, and C (see Table 1), in such a way that the heating effect cannot strongly impact the properties of the analyzed samples. In Table 1, the optical absorption was measured in the spectrum of the visible range.

TABLE 1

| | Increase in surface roughness | Energy gap (eV) | Change in absorption within the range 400-700 nm (%) | Young's modulus (GA) | Variation in Young modulus | Stiffness (N/m) | Maximum sample temperature (° C.) |
|---|---|---|---|---|---|---|---|
| Carbon | 2% | 0.6 | 0.17 | 53 | 87% | 42.00 | 1340 |
| Molybdenum | 12.2% | 1.5 | 27.2 | 13.5 | 88% | 2.01 | 1820 |
| Tantalum | 11.3% | 1.2 | 19.4 | 53.3 | 71% | 68.00 | 2330 |
| Titanium | 9.5% | 1.1 | 2.4 | 1 | 75% | 1.00 | 1200 |
| Tungsten | 1.5% | 0.7 | 0.16 | 163 | 50% | 48.13 | 2380 |

Since the proton-generating target was unheated, protons were the most effectively accelerated particles [45]. However, in a plasma acceleration process, other particles are also accelerated and co-moving, such as mainly electrons, carbon ions from surface contaminants, particles from the proton-generating target, such as gold for example in the case of a gold target, oxygen ions and photons [46]. The Thomson Parabolas were not able to detect neither traces of oxygen nor gold ions (see Supplementary notes below), since their quantity was below the detection threshold of about 4 orders of magnitude lower than the proton signal, similarly as found in Ref. [47]. In order to estimate and validate the influence of these particles on the damage caused on the material samples, the temperature influence on the global heating effect and their contribution to the global stress were both verified. The computed total deposited dose is indicated in the Supplementary notes below; the simulations show that the influence of the heating by the electrons is lower than 20% in the first 500 nm, hence contributing very little, and then becomes completely negligible deeper in the material sample (see FIG. 2A). The photon and heavy ion (carbon, gold, oxygen) heating contribution is always below 0.5% (see Supplementary notes below). Regarding the contribution to the total σφ value by the co-moving electrons and photons, it can be seen that the proton contribution overlaps with the total contribution; other contributions are negligible compared to the contribution of the protons [48] (see FIG. 2B). Concerning the heavy ions co-moving with the proton beam (Carbon, Hydroxide and Gold) it was considered that, as found in similar experiments [49], their energy can generate a very widely distributed simple ion implantation on the surface of the material sample or sometimes produce superficial coating effect, in particular debris. However, their low fluence, below $10^{10}$ particles/MeV/sr for C and OH; $10^8$ particles/MeV/sr for Gold, does not produce the growth of any Carbon, Oxygen or Gold monolayer on the surface of the material sample [50]. The ion implantation simply causes the formation of isolated defect points on the surface of the material sample, which can change the optical and electrical properties of the material sample. These changes in the characterization of the material samples were monitored, observing an opacification of the surface and the appearance of an optical band caused by the defective spots generated in the metallic lattice. In order to confirm that the protons and not other particle species caused the damage, some shots were repeated using in front of the irradiated sample a 5 μm aluminum filter, able to stop all heavier ions and debris. Despite the filter, the same damage signature as found without the filter could be observed in the irradiated samples (see Supplementary notes below).

FIG. 3 show morphological analysis results; gold images (bottom, right) illustrate the effects of proton irradiation on materials with low melting point (~1065° C. for Au); for the Gold sample the scale before irradiation is zoomed-in in order to check for surface details before irradiation. Morphological analysis conducted by SEM (FIG. 3) reveals that after the proton irradiation the initially smooth surface of the of the material samples shows cracks, fractures and holes indicating strong surface erosion resulting from the irradiation (few microns/shot for W and C, and hundreds of nm/shot for the other materials). Comparing these results to damages obtained using conventional methods, and considering the present focus on materials used in nuclear reactors, it can be seen that the material exhibits very similar features to what found on a SEM image of W used as divertor for the DEMO Facility and loaded with hydrogen on a conventional facility (see FIG. 19 of Ref. [51]—both images display very similar craters and patches and a significant erosion and high void density). Similar features can also be found when comparing the present results with what obtained using stress-test based on conventional facilities using He (see FIG. 21 of Ref. [51]). None of the present irradiated materials show melting regions or strongly topographic changes on the surface. In comparison, a material with a low melting point, such as gold, after the irradiation shows a completely melted surface and the formation of a highly porous and disordered structure (see FIG. 3L), with an erosion of hundreds of micron/year. Morphological, mechanical, and optical characterizations were obtained considering the proton spectrum of FIG. 1. Since the proton spectrum tends to fluctuate during shots, the values of the characterization are subject to uncertainty, too, and depend on the delivered dose.

Optical absorption measurements in FIGS. 4A-4E show a general increase in the optical absorption, due to irradiation with the laser-accelerated particles, with greater values for Mo and Ta (19.4% and 27.2% respectively). This corresponds to an increase in the band gap due to irradiation with the laser-accelerated particle (see Tauc's plot for W as an example for all materials in FIG. 4F), which ranges from the 0.6 eV of Carbon to the 1.5 eV of Molybdenum, suggesting a formation of a small layer of oxide on the surface of the irradiated material sample, considering a thickness of a few nanometers. The changes in the optical gaps can be associated to both changes in the surface roughness and a large number of local defects/gaps introduced in the material's lattice by the proton irradiation, defects that change the density of state in the irradiation points. This results in strong changes of the electronic properties, the loss of a metallic behavior and the appearance of an increasing energy gap. AFM measurements indicate a general increase of the surface roughness of about 10% for all materials while nano-indentation measurements under AFM conditions (Table 1 and FIG. 4G: the portion marked as Y is used for estimating the Young's modulus) indicate a general decrease of the Young's modulus and a consequent increase in the stiffness, which suggests a general increase in the rigidity of the material sample, ranging from 50% for Molybdenum to 87% for Tungsten.

Figure 4G:
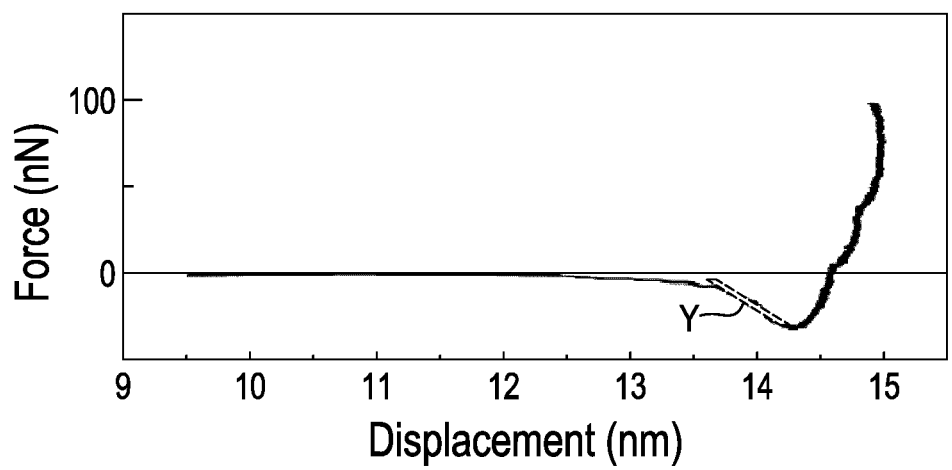
FIG. 4G shows tip force as function of piezo displacement for indentation measurements for the tungsten sample.
Figure 4H:
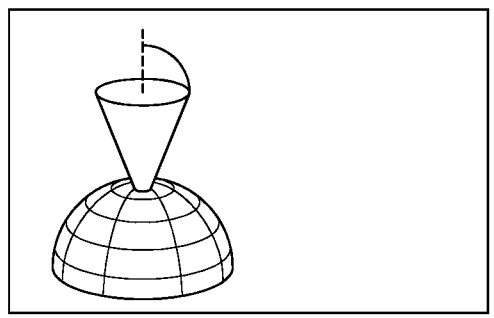
FIG. 4H is a diagrammatic view of a theoretical model used to study the interaction between the conical tip and the material sample in the scanning model according to an embodiment of an aspect of the present invention.
Figure 4I:
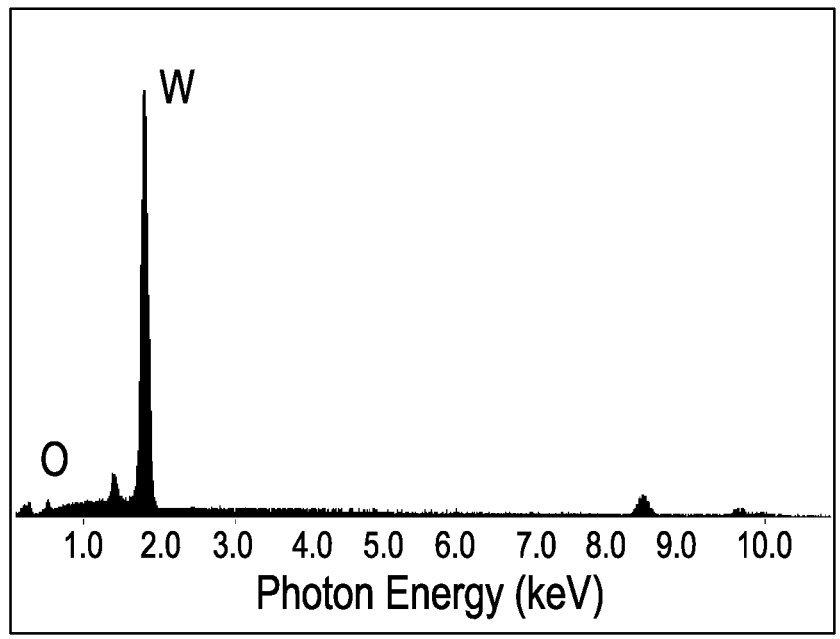
FIG. 4I shows EDX analysis after irradiation for tungsten (W)

EDX analysis under SEM conditions (see FIG. 4I for the material W as example for all materials) indicates that the chemical composition of the material sample is unchanged within the detection limit of the EDX (1000 ppm), with only a small weight percent presence of Gold (about 3%) indicating the implantation of energetic gold atoms (present in the proton beam residuals of the TNSA mechanism) on the surface of the material sample, and a small amount of oxygen detected into the first surface layers of the material sample. The non-negligible gold ion implantation on the material samples suggests that it is possible to implant energetic atomic and ion beams produced during the nuclear fusion process and to induce strong chemical changes on the surface of the material samples. The small oxygen amount can be attributed to the oxygen impurities in the proton beam: during the acceleration process, a few oxygen atoms stem out from the back surface of the target. These atoms come from a very thin contaminant layer located on the back surface of the target (an example of detailed composition of the back surface can be found in Ref. [52] and Ref. [53], mentioning a 12-20 Å-thick layer consisting of 27% gold, 60.5% hydrocarbons ($CH_2$), and 12.2% water vapor ($H_2O$)). From the EDX microanalysis the oxygen percentage is estimated to be in the order of 5% (FIG. 4I).

Supplementary Notes
Details About the Material Science Diagnostics

AFM images were obtained using a Bruker-ICON AFM microscope working in tapping mode. Each image was taken with a resolution of 512×512 pixels and a frequency of 1 Hz.

A nano-indentation analysis for measuring the changes in the mechanical properties module was performed under AFM condition, using a Sneddon model (conical indenter). The optical absorption of the particle films was measured under an Olympus microscope (Horiba-Jobin-Yvon) equipped with a white lamp, and with a Triax 320 spectrometer working in the 200-1500 nm range. The reflected spectrum $I_r(\lambda)$ was measured directly and, assuming the transmittance to be zero for the bulk samples, the reflectance $r(\lambda)$ and the absorbance $\alpha(\lambda)$ were obtained as a function of wavelength by the relation:

$$r(\lambda) = \frac{I_r(\lambda)}{I_s(\lambda)}$$

$$\alpha(\lambda) = (1 - r(\lambda))$$

where $I_s(\lambda)$ is the source spectrum. The energy gap of the materials after irradiation was obtained from optical absorption using the Tauc's model. The value r=½ was used for the exponent in the plot of $(\alpha h v)^{1/r}$ as function of hv, denoting the nature of direct transitions of the observed phenomena.

Details About the Thomson Parabolas

Figure 5:
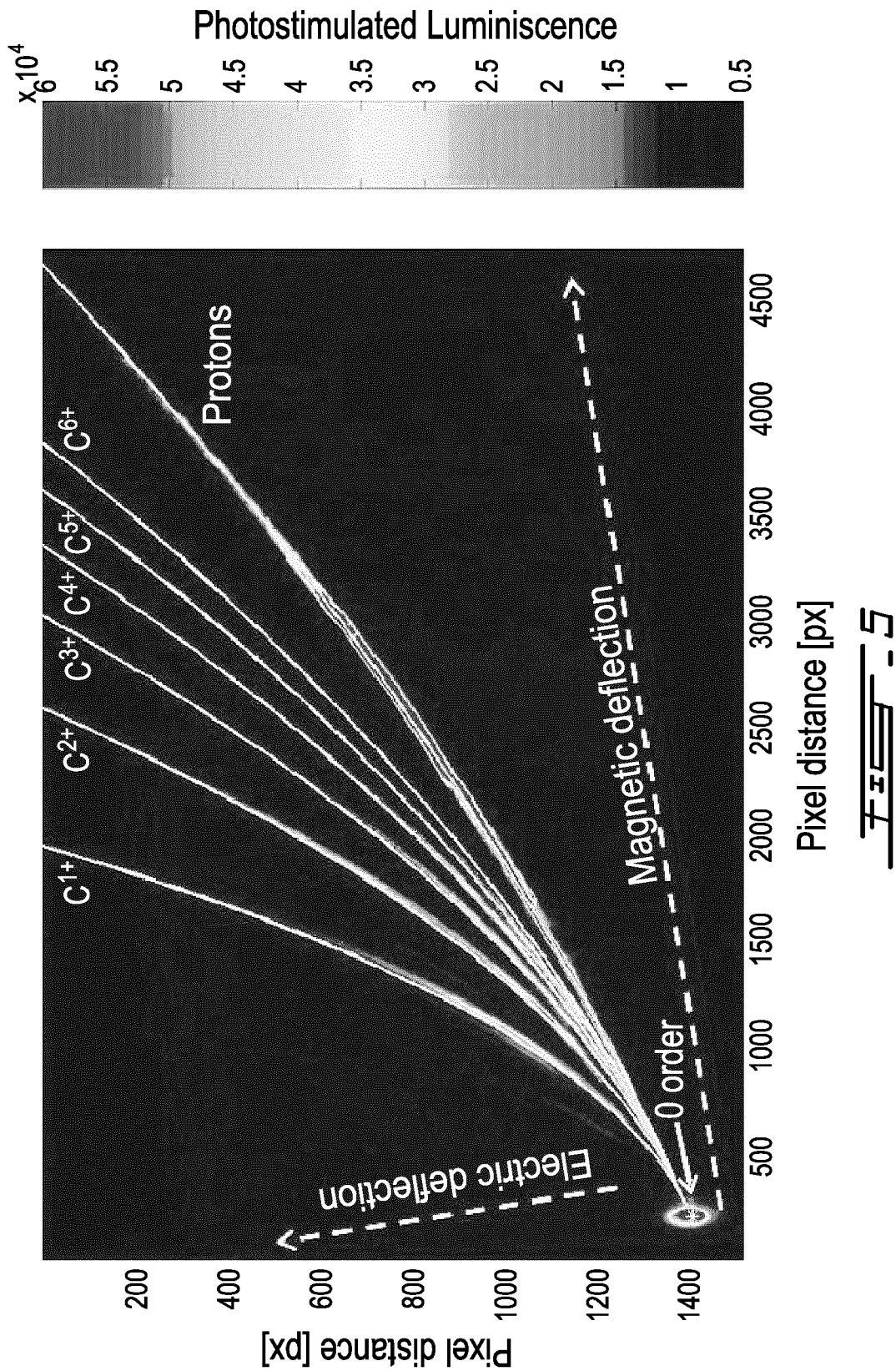
FIG. 5 shows a raw image plate image as obtained by the image plate diagnostics of the Thomson parabola, displaying the proton and carbon spectra.

As proton diagnostic two calibrated Thomson Parabolas (TPs) located at 0° (TP0°) and 16° (TP 16°) with respect to the main pulse laser axis were used to measure the forward generated proton spectrum (see FIG. 1A). The Thomson parabolas were placed respectively at a distance of 690 and 565 mm from the proton source (distance to the entrance slit). The magnetic field of the dipole for both Thomson parabolas was about 500 mT and had a length of 150 mm. The voltage applied to the electrodes following the magnetic dipole was +−3 kV. The incoming ion beam at the entrance of the Thomson parabola was selected with an aperture of about 0.5 mm. Proton spectra measured by the Thomson parabolas were readout in an absolute manner, using Image Plates (BAS-TR 2025 from Fuji Photo Film Co. Ltd) that were analyzed using a FUJIFILM FLA-7000 reader (see example of a raw image in FIG. 5). Additional measurements of the proton spectra were obtained using Radio Chromic Films (RCFs) of the type HS that allowed obtaining a beam spatial distribution. The calibration was performed by using known metallic foils of Al, placed in front of the Image Plates, which produce well defined cut-off energies and are linked to a specific distance from the beam center, also called 0 point. These cut-off distances allow the reconstruction of a curve showing deflections vs particle energy, which is the calibration of the specific Thomson parabola.

Figure 6:
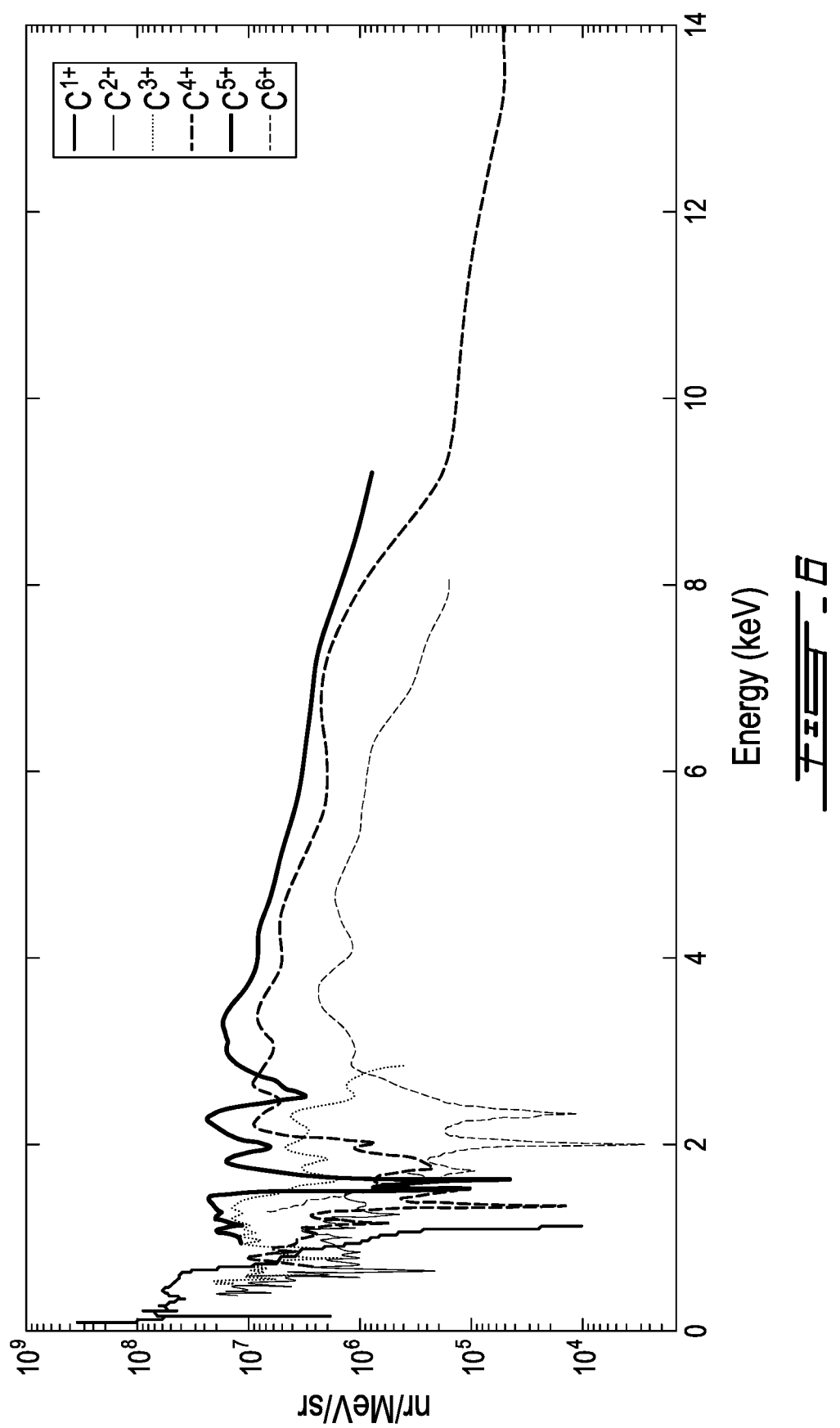
FIG. 6 shows carbon spectra as obtained from the Image Plate shown in FIG. 5.

FIG. 6 shows an example of deconvoluted carbon spectra as obtained using a solid 10 μm gold target. Compared to the number of protons reported in FIG. 1D, the number of carbon ions is significantly less; there is a difference of more than two orders of magnitude for all energies within the spectrum of each species.

Maximum temperature as obtained during the laser-driven proton irradiation.

Figure 7:
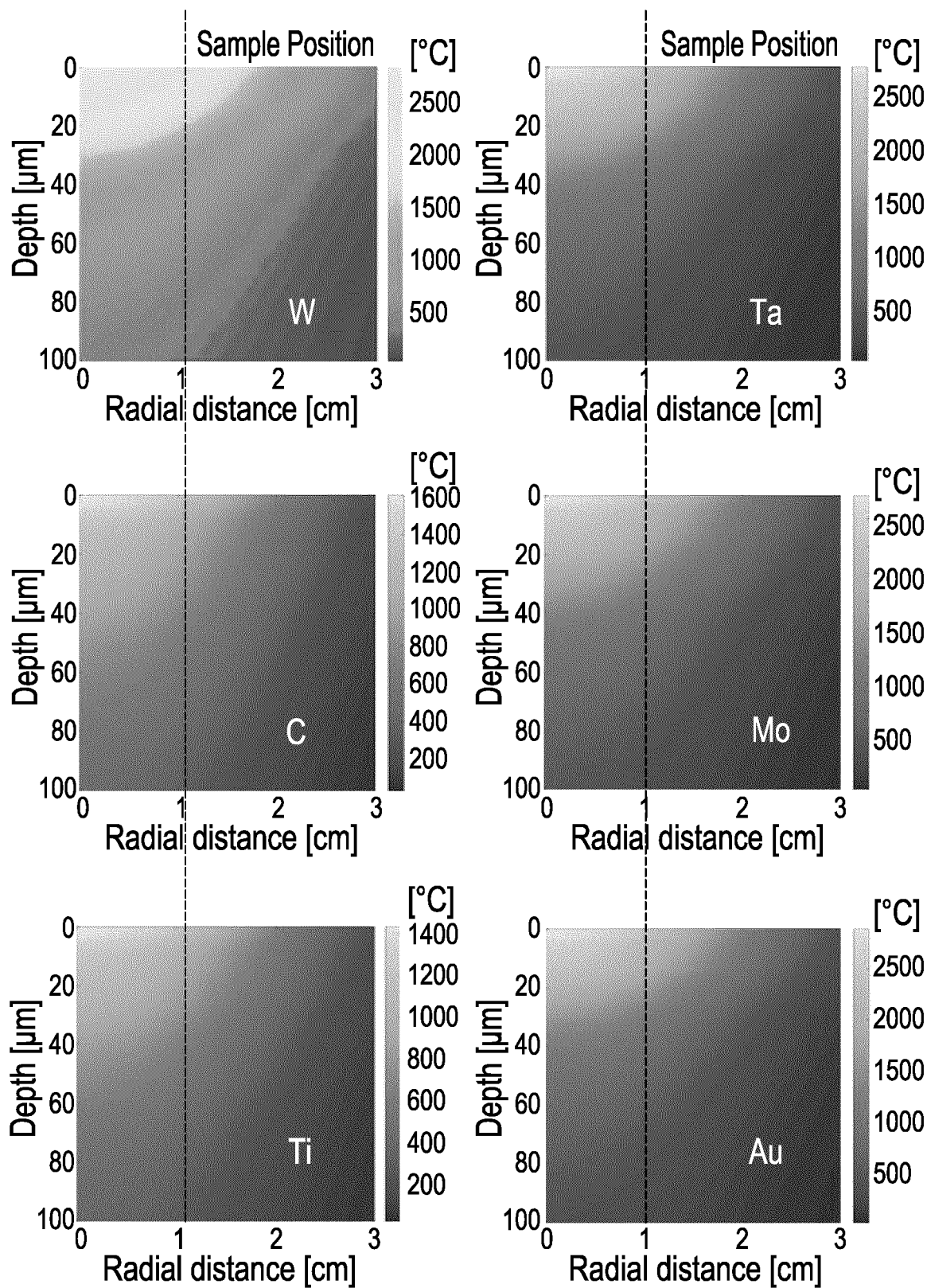
FIG. 7 shows different temperatures maps obtained by the energy deposition Code for different samples; the line indicates the position R=1 where the samples were placed; protons impinging the samples from the top.

FIG. 7 shows the temperature maps for the material samples used in the experiments described hereinabove as obtained with the custom-made code that has been benchmarked with other Monte Carlo codes such as FLUKA and Geant4. The radial distance of R=0 corresponds to the proton beam center. Since the samples were placed at 1 cm above the beam center, the temperature to consider is the temperature at R=1 cm; the temperature below R=1 cm was added for general information. Radial and longitudinal lineouts were added for the tungsten sample, as example for all, to show the radial and longitudinal evolution of the temperature within a sample in FIG. 8.

In the present case, the heating of the samples to temperatures up to the 2500° C. occurs over very short timelines, in the tens of ns at maximum. Temperature measurements using pyrometers or thermocouples cannot resolve the quick heating phase. Spectrometer measurements, such as x-ray absorption near edge spectroscopy (XANES) may be used, but the precision is not optimized for the present experiment.

Benchmarking of Different Codes to Verify the Energy Deposition

Figure 8:
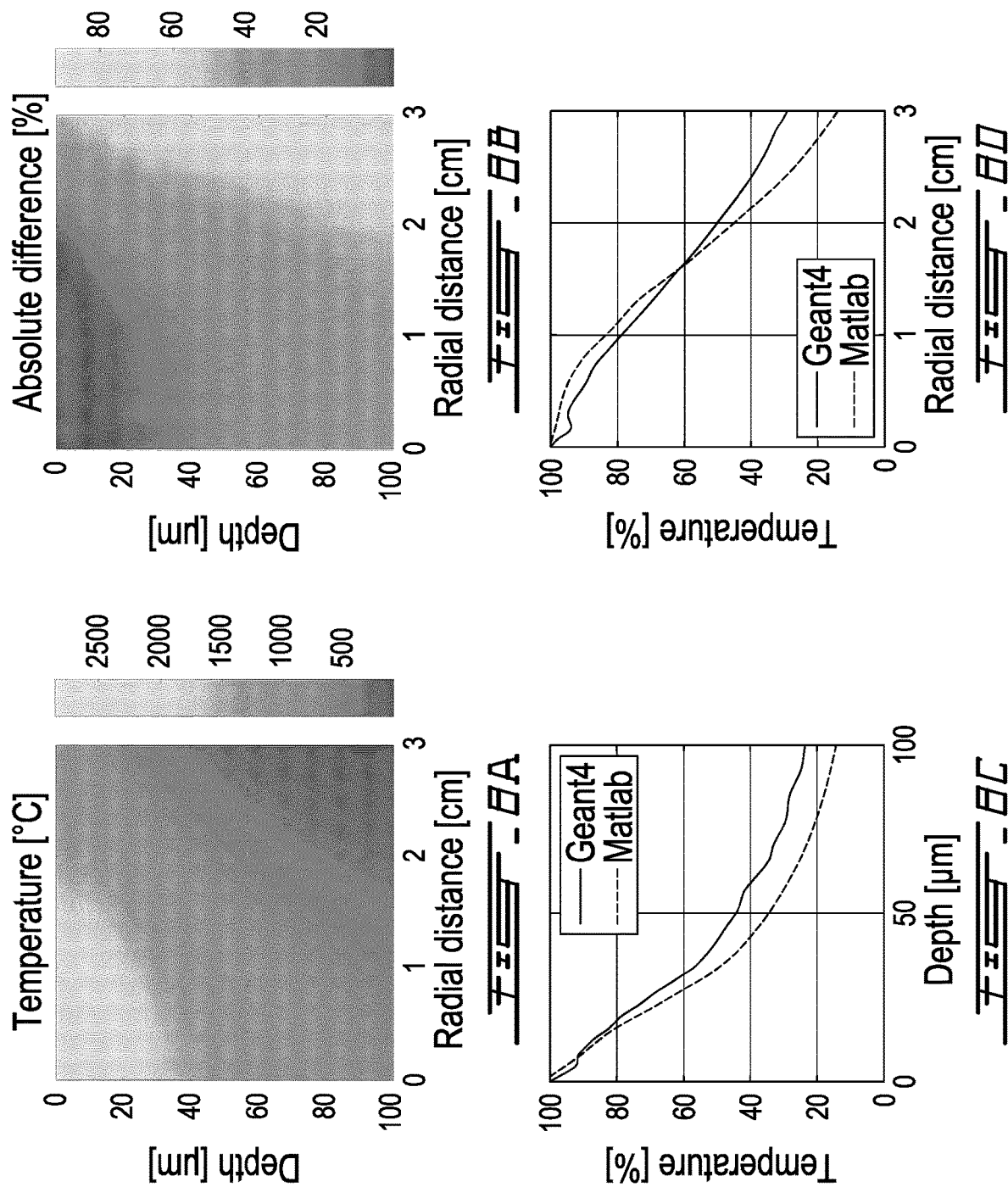
FIG. 8A shows a temperature map for the tungsten sample as computed by the Geant4 code.
FIG. 8B shows the absolute difference between the computed values as obtained with a custom-made code and the Geant4 code.
FIG. 8C shows a depth lineout of both maps of FIGS. 8A and 8B for R=0 cm.
FIG. 8D shows radial lineout of both maps of FIGS. 8A and 8B at the surface.

FIG. 8 show results of the benchmarking between the custom-made energy deposition code and Geant4. Regarding Geant4, the version 10.2 (patch 02) was used and the physics list G4EmStandardPhysics_option4, the secondary particle production cut off was 10 nm. In both cases, the simulation took as input data the proton spectrum, the cone beam half-angle as well as the virtual source position variation with proton energy. The virtual point source is not a physical source point; its distance is calculated by the projection of the protons trajectories stemming out from the back surface of the target (see FIG. 1B).

In the custom-made code, proton energy is deposited locally through the use of stopping power values for each material available on the NIST-PSTAR database. The full cone beam is split in multiple beamlets with different incident angles on the target. A Gaussian transverse proton beam intensity profile is used, for which the angular standard deviation corresponds to the cone beam's half-angle. FIG. 8A shows the temperature map as obtained with the Geant4 code for the tungsten sample in the same conditions as for FIG. 7 (upper left temperature map). The absolute difference, in percentage, is indicated in FIG. 8B, displaying negligible temperature variations, less than 5%, in the regions of interest of the sample. FIG. 8C shows a depth lineout of the temperature maps for the tungsten sample at the radial position R=0, while FIG. 8D the radial lineout at the surface, i.e. depth=0 µm. Lineouts are taken for both, the Geant4 and the custom-made energy deposition code simulations.

Dose Deposition

Figure 10:
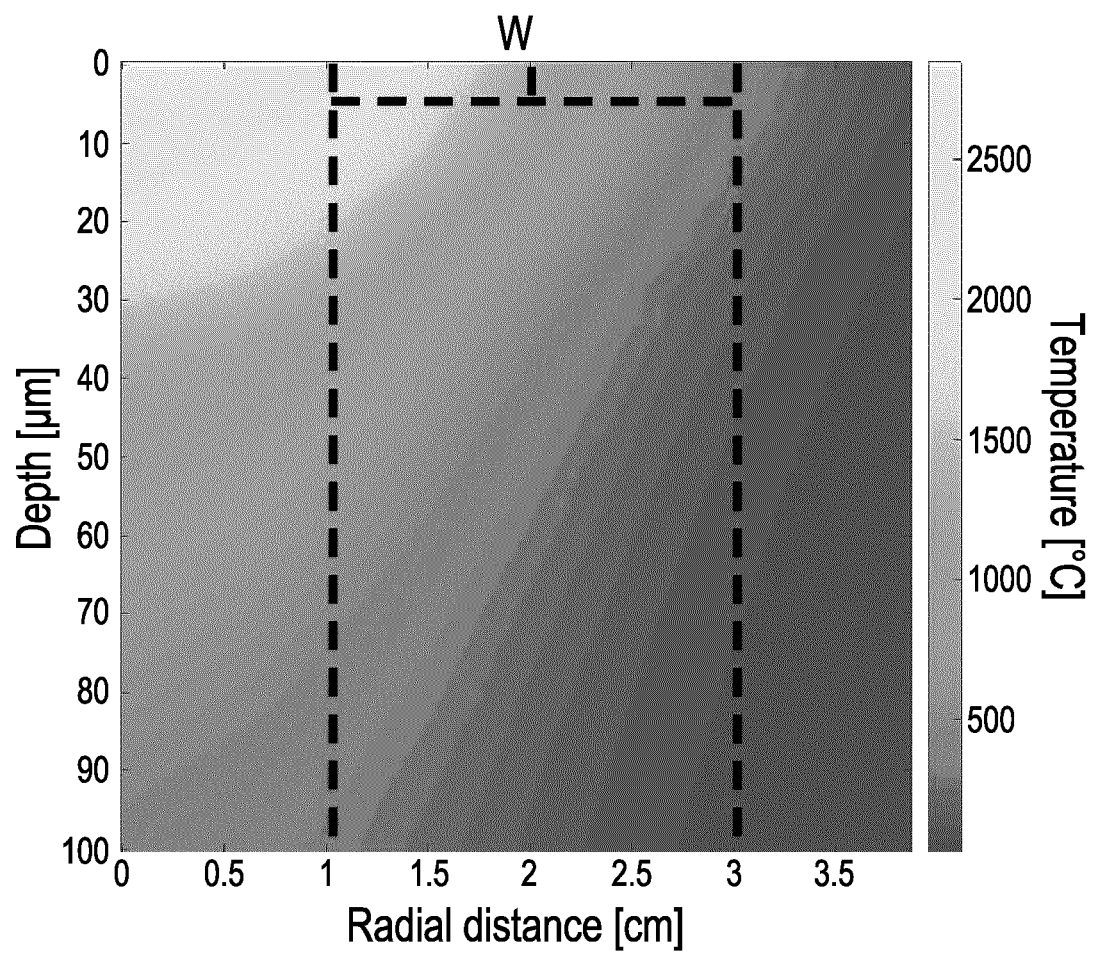
FIG. 10 is a schematic of how the dose calculations were made, with the sample located within a radial distance in the range between 1 cm and 3 cm; different depths were considered which produced different volume.

The calculated dose, indicated in J/kg, depends on the volume to be considered. Due to the large energy spectrum, the impinging particles deposit their dose in different depths. The Table of FIG. 9 gives information about the deposited dose as calculated by the Energy Deposition code for several relevant volumes (see FIG. 10 for the different volumes). The average dose $D_{ave}$ was computed as follows: $D_{ave}=c_p \cdot \Delta T_{ave}$. The considered volumes were $V_1$=2 mm×20 mm×100 µm, $V_2$=2 mm×10 mm×100 µm, $V_3$=2 mm×20 mm×5 µm, and $V_4$=2 mm×10 mm×5 µm.

Protected Sample Images

Figure 11:
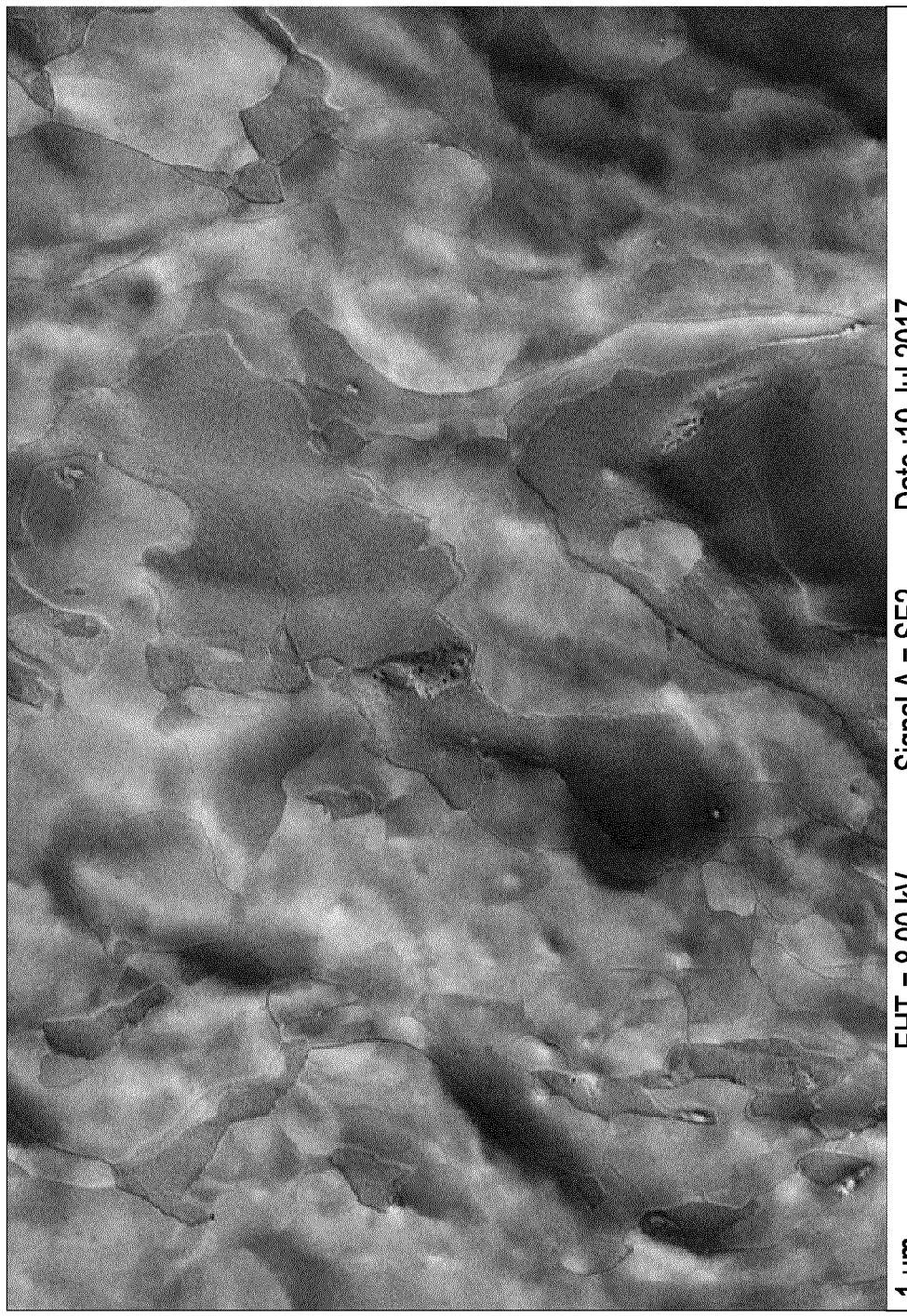
FIG. 11 is SEM image of a tungsten sample protected by a 5 µm Al foil.
Figure 12:
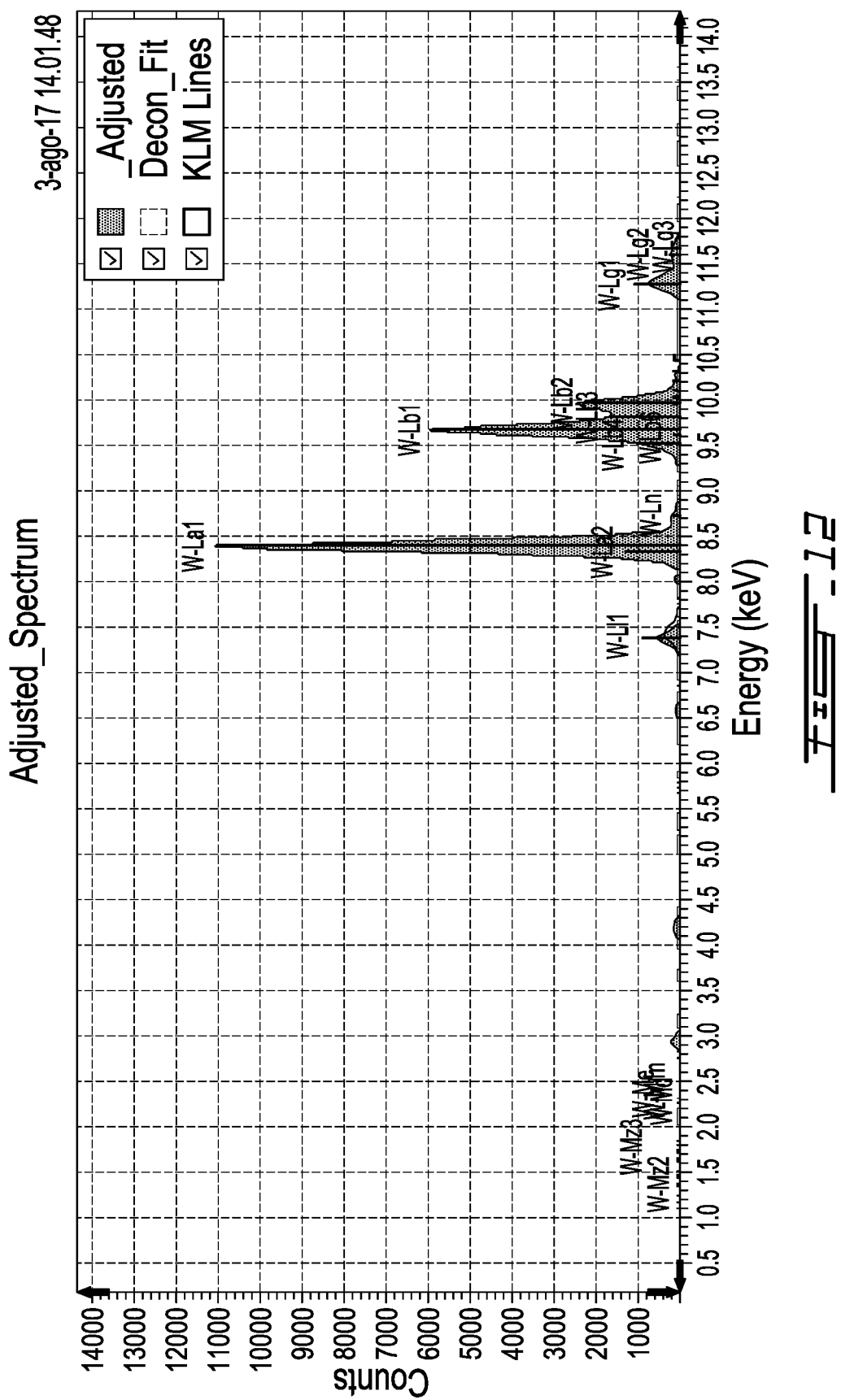
FIG. 12 is an XRF analysis of the tungsten sample of FIG. 11.

FIG. 11 is a SEM image of a Tungsten sample irradiated by laser-accelerated protons as obtained on the TITAN laser. The Tungsten sample was screened by a 5 µm aluminum foil in order to avoid contributions by heavier ions. FIG. 12 shows an XRF analysis of the tungsten sample irradiated with laser-accelerated proton.

It was thus shown that laser-accelerated proton irradiation is suitable for performing stress tests on materials and is particularly adapted to reproduce damage of materials working in a harsh environment. Theoretical simulations indicate that the temperature reached on all analyzed materials is lower than the melting point. Morphological analysis on the surfaces after the irradiation indicates the formation of many cracks and holes with an erosion of hundreds of nm for Ta, Ti, and Mo and few microns for W and C. Nano-indentation investigation shows a general increase in the sample rigidity. Moreover, chemical and optical data show an increase in the optical absorption and a band gap with a formation of a thin layer of oxide on the surface and the implantation of energetic ions present in the beam.

There was provided herein experimental evidences that laser-accelerated protons can be used for stress testing materials and are particularly suited for identifying materials to be used in harsh condition. It was shown that these laser-accelerated protons can produce, in a very short time, a strong mechanical and thermal damage, that, given the short irradiation time, does not allow for recovery of the material. This was confirmed by analyzing changes in the mechanical, optical, electrical, and morphological properties of five materials of interest to be used in harsh conditions.

Although the above was described using laser-accelerated protons, the method and system may use other laser-accelerated particles and photons, such as protons, electrons, neutrons, X and gamma-rays, depending on the target level of stress to be produced on the samples under examination for example.

There is thus provided a system for material stress testing, comprising a high-intensity short pulse (duration<1 ps) laser and focusing unit allowing delivering an on-target intensity of at least $10^{13}$ W/cm², for example of at least $10^{18}$ W/cm², on a target, the focusing unit allowing to generate the required intensity on the target, thereby generating laser-accelerated particles irradiating a material sample.

The material sample to be tested is typically a solid. It may also be a liquid or a gas material, provided that the material once deformed under irradiation retains its deformation/degradation a time allowing measurement thereof.

The target acting as a laser-accelerated particles source may be a solid, a gas such as such as N or O for example, or a plasma target, of a thickness that allows for the particles/photons production. Typically, a solid target is selected with a thickness in the range between about 1 nm and about 200 µm, for example in the range between about 5 nm and 100 µm. A gas target may be selected with a thickness in the range between about 10 nm and about 10 mm, for example between 0.1 mm and 5 mm. A plasma target may be selected with a thickness in the range between about 0.1 µm and about 100 µm, for example between 0.1 mm and 100 µm.

The target is positioned at a distance from the focused laser pulse selected so as to allows sufficient intensity to generate the particles or photons. Typical focusing optics include f/1 up to f/20, depending on the laser waist and energy, and on the particles to be accelerated; a typical distance is a few tens of centimeter for example of at least 10 cm, for an f/1 focusing parabola, up to a few meters, for example at most 10 meters, for a longer focal length (f/20).

The laser-accelerated particles generated by the laser-matter interaction may be protons, electrons, neutrons, X-rays and gamma-rays for example.

The material sample is positioned at a distance from the target acting as an accelerated-particles source, typically at least about 0,01 mm away. The sample may be located as far as a few meters, for example at about 8 meters or more, for example 10 m from the target, by using a transportation unit directing the laser-accelerated particles generated by the target to the sample, including for example magnetic lenses (quadrupoles) and solenoids.

In the case of a sample in a solid material such as gold or aluminum for example, the thickness is comprised in the range between about 5 nm in case of a DLC target for example and about 50 µm in case of Target-Normal-Sheath Acceleration (TNSA) for example.

Metallic samples to be tested may be selected in high-melting point material such as for example tungsten, graphite, titanium, tantalum, and molybdenum.

The present method was found to be fast, since it can be performed with a few single laser-shots, and the present system was found to be compact, as the method can be performed using a table-top high-power laser.

The scope of the claims should not be limited by the embodiments set forth in the examples, but should be given the broadest interpretation consistent with the description as a whole.

REFERENCES

1. M. Borghesi et al., Phys. Rev. Lett. 92, 055003 (2004)
2. T. E. Cowan et al., Phys. Rev. Lett. 92, 204801 (2004)
3. B. Albertazzi et al., Science 346, 325 (2014)
4. Patel et al., Phys. Rev. Lett. 91, 125004 (2003)
5. D. P. Higginson et al., Phys. Rev. Lett. 115, 054802 (2015)
6. M. Roth et al., Phys. Rev. Lett. 110, 044802 (2012)
7. K. W. Ledingham et al, Applied Sciences 4(3), 402, (2014)
8. B. Dromey et al., Nature Communications 7, 10642 (2016)
9. M. Barberio, S. Veltri, M. Scisció, P. Antici, Sci. Rep. 7, 40415 (2017)
10. Editorial, Nature Materials 15, 1 doi:10.1038/nmat4533 (2016)
11. X. Xia et al., Journal of Alloys and Compounds, 644, 308 (2015)
12. T. J. Tanaka et al., J. Nucl. Mater. 347, 244 (2005)
13. R. A. Raffray and the HAPL team, J. Nucl. Mater. 347, 178 (2005)
14. J. D. Sethian et al., IEEE Trans. Plasma Sci. 38, 690 (2010)
15. J. F. Latkowski, R. P. Abbott, R. C. Schmitt and B. K. Bell, J. Nucl. Mater. 347, 255 (2005)
16. J. Renk et al., J. Nucl. Mater. 347, 266 (2005)
17. S. J. Zenobia, R. F. Radel, B. B. Cipiti and G. L. Kulcinski, J. Nucl. Mater. 389, 213 (2009)
18. C. Kittel, Introduction to Solid State Physics, 8th Edition, Wiley (1991)
19. B. C. Stuart et al., *Conference on Lasers and Electro-Optics/Quantum Electronics and Laser Science Conference and Photonic Applications Systems Technologies*, Technical Digest (CD) (Optical Society of America, 2006), paper JTuG3; TITAN Laser characteristic can be found online at: https://jlf.llnl.gov/ (2015) (Date of access: 5 Jul. 2017)
20. S. C. Wilks, W. Kruer, M. Tabak, and A. B. Langdon, Phys. Rev. Lett. 69, 1383 (1992)
21. S. N. Chen et al., Physics of Plasmas 21, 023119 (2014)
22. A. Mancic et al., High Energy Density Physics 6, 21 (2010)
23. B. Albertazzi et al., EPJ Web of Conferences 59, 17014 (2013)
24. J. Fuchs et al., Nature Physics 2, 48-54 (2006)
25. K. Zeil et al., New Journal of Physics 12, 045015 (2010)
26. J. Alvarez et al., Plasma and Fusion Research 8, 3404055 (2013)
27. T. T. Bohlen et al. Nuclear Data Sheets 120, 211 (2014)
28. G. Battistoni et al. Prog. Nuc. Sc. Techn. 2, 358 (2011)
29. J. Allison et al., IEEE Transactions on Nuclear Science 53 270 (2006)
30. S. Agostinelli et al., Nuclear Instruments and Methods A 506, 250 (2003)
31. A. Mancic et al., High Energy Density Physics 6, 21 (2010)
32. K. Flippo et al., Rev. Sci. Intrum. 79, 10E534 (2008)
33. R. A. Snavely et al., Phys. Rev. Lett. 85, 2945 (2000)
34. I. J. Kim et al., Phys. Rev. Lett. 111, 165003 (2013)
35. R. Toschi et al., Fusion Engineering and Design 163, 56, (2001)
36. H. Bolt et al, Journal of Nuclear Materials 66, 329-333, (2004)
37. W. R. Meier et al., Fusion Engineering and Design 89, 2489 (2014)
38. C. H. M. Broeders and A. Y. Konobeyev, Journal of Nuclear Materials 336, 201-209 (2005)
39. B. Albertazzi et al., EPJ Web of Conferences 59, 17014 (2013)
40. J. Fuchs et al., Phys. Rev. Lett. 94, 045004 (2005)
41. J. S. Green et al., Appl. Phys. Lett. 104, 214101 (2014)
42. K. Zeil et al., New J. Phys. 12, 045015 (2010)
43. P. Antici et al., ECA, 29 C 0-3.003 (2006)
44. P. Antici et al., J. Phys. IV 133, 1077 (2006)
45. M. Hegelich et al., Phys Rev Lett. 89, 085002 (2002)
46. J. F. Seely et al., High Energy Density Physics 7, 150 (2011)
47. E. L. Clark et al., Phys. Rev. Lett., 84, 670 (2000)
48. M. J. Catarula et al., Linear Collider Collaboration Tech Notes, LCC-0093, UCRL-JC-148049 (2002); T. Fukahori, Y. Iwamoto, A calculation method of PKA, KERMA and DPA from evaluated nuclear data with an effective single particle emission approximation (ESPEA) & Introduction of Event Generator Mode in PHITS Code, presented at IAEA/TM on Primary Radiation Damage: from nuclear reaction to point defect, 1-4 Oct. 2012, VIC, Room A2712, IAEA, Vienna, Austria
49. L. Torrisi et al., Plasma Phys. Control. Fusion 58, 025011 (2016)
50. P. Mckenna et al., Plasma Phys. Control. Fusion 49 (2007) B223; K. Harres et al., Rev. Sci. Instrum. 79, 093306 (2008)
51. M. Rieth et al., Journal of Nuclear Materials 432, 482 (2013)
52. M. Allen et al., Phys. Rev. Lett. 93, 265004 (2004)
53. S. Gitomer et al., Phys. Fluids 29, 2679 (1986)

The invention claimed is:

1. A method for stress testing a material, comprising determining the heat diffusion and the melting temperature of the material, selecting a laser, positioning a target at a distance from the material; and irradiating the target with the laser, the target generating directional laser-accelerated protons, directing the protons to a surface of the material, and measuring resulting modifications of the material, wherein the laser is selected for emitting a beam of a pulse duration less than 1 ns to deliver an on-target intensity of at least $10^{18}$ W/cm$^2$, a material and a thickness of the target and the distance between the target and the material are selected according to an initial temperature, the heat diffusion and the melting temperature of the material and energy and flux of the protons impinging on the material, thereby controlling energy transfer to the material as determined on a selected stress level for the stress testing.

2. The method of claim 1, wherein the target is a gas.
3. The method of claim 1, wherein the target is a plasma.
4. The method of claim 1, wherein the material is a solid.
5. The method of claim 1, wherein the material is a gas.
6. The method of claim 1, wherein the material is a liquid.
7. The method of claim 1, comprising selecting a distance between the target and the laser.

* * * * *